United States Patent [19]

Tanaka et al.

[11] Patent Number: 4,804,812
[45] Date of Patent: Feb. 14, 1989

[54] MICROWAVE OVEN WITH COMBINED ROTARY HEATER AND WAVE GUIDE PLATE

[75] Inventors: Junzo Tanaka, Fujiidera; Yasuyuki Motozuka, Kashihara, both of Japan

[73] Assignee: Matsushita Electric Industrial Co., Ltd., Kadoma, Japan

[21] Appl. No.: 108,661

[22] Filed: Oct. 14, 1987

[30] Foreign Application Priority Data

Oct. 15, 1986 [JP] Japan ................. 61-244536
Jan. 30, 1987 [JP] Japan ................. 62-20811

[51] Int. Cl.<sup>4</sup> ............................... H05B 6/72
[52] U.S. Cl. ................. 219/10.55 F; 219/10.55 B
[58] Field of Search ............. 219/10.55 F, 10.55 R, 219/10.55 D, 10.55 E, 10.55 B

[56] References Cited

U.S. PATENT DOCUMENTS

| | | | |
|---|---|---|---|
| 2,920,174 | 1/1960 | Haagensen | 219/10.55 F |
| 3,562,471 | 2/1971 | White | 219/10.55 F |
| 4,176,266 | 11/1979 | Kaneko et al. | 219/10.55 F |
| 4,185,181 | 1/1980 | Kaneko et al. | 219/10.55 F |
| 4,326,113 | 4/1982 | Toyoda et al. | 219/10.55 F |
| 4,471,193 | 9/1984 | Walter | 219/10.55 B |
| 4,547,643 | 10/1985 | Yamauchi | 219/10.55 R |
| 4,568,811 | 2/1986 | Yoshimura et al. | 219/10.55 F |

FOREIGN PATENT DOCUMENTS

| | | |
|---|---|---|
| 0148562 | 7/1985 | European Pat. Off. . |
| 1227096 | 10/1962 | Fed. Rep. of Germany . |
| 3039886 | 5/1981 | Fed. Rep. of Germany . |
| 3427261 | 3/1985 | Fed. Rep. of Germany . |

*Primary Examiner*—Philip H. Leung
*Attorney, Agent, or Firm*—Cushman, Darby & Cushman

[57] ABSTRACT

A microwave oven with heater has a wave guide plate between a rotary heater and a wall of a heating chamber on which a bearing for the rotary heater is provided, for controlling microwave to improve distribution thereof, and further, preventing adhesion of scattered food thereby to maintain insulation between the heating chamber on the rotary heater.

5 Claims, 7 Drawing Sheets

MICROWAVE OVEN WITH COMBINED ROTARY HEATER AND WAVE GUIDE PLATE

FIELD OF THE INVENTION AND RELATED ART STATEMENT

1. Field of the Invention

The present invention relates to a heating oven, and more particularly to a microwave food heating oven with electric heater in its heating chamber.

2. Description of the Related Art

Heretofore, various methods have been used for making microwave distribution uniform in a heating chamber. Conventional examples are as follows:
(1) mixing the microwave by a stirring blade,
(2) rotating a food to be cooked by putting it on a turn table,
(3) changing direction of microwave radiation by using a rotary antenna, a microwave guide plate or a rotary wave guide.

Figure 1:
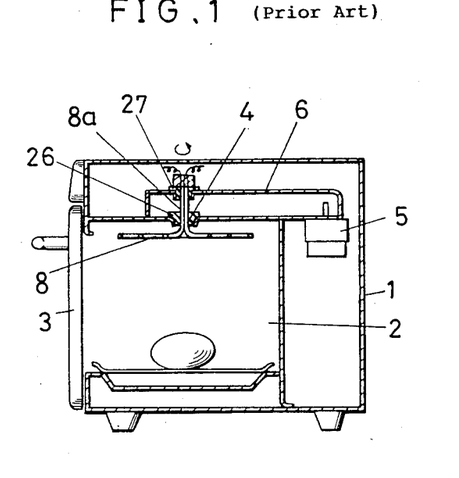
FIG. 1 is the schematic side sectional view showing the conventional microwave oven.
Figure 2:
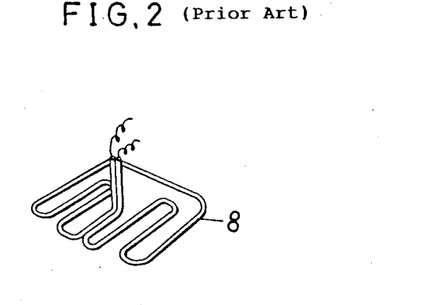
FIG. 2 is the perspective view of the heater of the conventional microwave oven.

One of the inventor of the present invention has made an invention improving the above-mentioned rotary antenna and filed a Japanese patent application which has been published as examined patent application Sho No. 56-39040. In this related art, as shown in FIG. 1, a heating chamber 2 is provided in an oven casing 1. The heating chamber 2 has a front door 3. A microwave feeding portion 4 is formed on a ceiling wall of the heating chamber 2. A magnetron 5 is connected to the microwave feeding portion 4 by a wave guide 6, which is connected to the heating chamber 2 by coaxial feeding. A rotary heater 8 for browning foods is provided in the heating chamber 2. As shown in FIG. 2, end parts of the heater 8a function also as microwave receiver of the coaxial feeding. In the above-mentioned microwave oven, by making the heater function as the antenna, a microwave having good mixing and distribution of the microwave and good distribution of heat for browning the foods is provided.

However, in such a microwave oven, bearings 26 and 27 for the rotary 8 made of material of low dielectric constant and high heat resistance, such as ceramics, are provided to the microwave feeding portion 4 and the wave guide 6, respectively. Since at the part near the microwave feeding portion 4, an electric field is strong and the heated food is likely to be scattered therearound during cooking and sticks to the bearing 26, thereby to induce deterioration of insulation of the bearing 26. As a result, spark-discharge is likely to be caused between the wall of the heating chamber 2 and the bearing 26. Once spark-discharge generates, even when the bearing 26 is made of insulator such as ceramic, it is easily deteriorated and becomes impossible to use the bearing no more after the spark-discharge, since a surface of the bearing 26 is carbonized by arc, to cause serial sparks and at last the bearing 26 breaks. On the other hand, when it is intended to prevent sticking of the scattered food to the bearing by entirely covering the heater 8, thermal efficiency of the heater 8 is extremely lowered, and further there is a serious problem that the heating chamber is made narrow. Moreover, when it is intended to improve the heat distribution of the heater 8, the distribution of the microwave becomes insufficient. Furthermore, output of the microwave is insufficient because of insufficient impedance matching. On the contrary, when the oven is designed by taking account the output size and the distribution of the microwave as most important items, the heat distribution of the heater 8 becomes insufficient. That is, it is very much difficult to realize the microwave oven wherein the output and distribution of the microwave and the efficiency and thermal distribution of the heater are all sufficient.

OBJECT AND SUMMARY OF THE INVENTION

The present invention is intended to solve the above-mentioned problems, and the object of the present invention is to provide a microwave oven with heater, wherein thermal distribution of a rotary heater is improved, and output and distribution of microwave are sufficient, thereby having splendid cooking ability.

The above-mentioned object is accomplished by a microwave oven with heater which comprises:
 a heating chamber provided in a body,
 a microwvve generator for generating microwave,
 a microwave feeding portion provided to the heating chamber,
 a wave guide connecting the microwave generator to the microwave feeding portion,
 a rotary heater provided in the heating chamber and rotatable around an axis substantially of center of the microwave feeding portion, and
 a wave guide plate for equally uniformly radiating the microwave generated by the microwave generator, the wave guide plate being provided between the rotary heater and ceiling of the heating chamber and fixed to the rotary heater.

In the microwave oven with heater of the present invention, the rotary heater is used. Therefore, freedom of design of the heater is expanded, for example as follows. First, heating capacity required for cooking is determined, and thereafter a configuration of the heater most suitable for realizing desirable cooking ability is determined. The wave guide plate having a configuration capable of covering the microwave feeding portion is attached at upper side of the heater in a manner to give the most preferable output efficiency and distribution of the microwave. Thus, the output and distribution of the microwave are controlled by the wave guide plate. As a result, it becomes possible to determine the configuration of the heater without taking into account the radiation condition of the microwave and improvement of the output efficiency and distribution of the microwave, independently from configuration of the heater.

Moreover, since the wave guide is close to the heater, by covering the surface of wave guide plate with whity enamel, reflection of infrared rays can be made large, thereby to shorten cooking time and to improve browning ability. Moreover, when the surface of the wave guide is coated by a ceramic coating material or the like, large amount of extreme infrared rays is radiated, and therefore, effective browning of the food is realized.

That is, the microwave oven of the present invention has the following features in comparison with the conventional microwave oven shown in the Japanese published examined patent application Sho No. 56-39040:
 (1) In the conventional microwave oven, when a food is grilled it must be put near the heater. As a result scattered substance from the food sticks to the bearing formed on the microwave feeding portion to cause deterioration of insulation thereof, and at last, sparkdischarge between the wall of the heating chamber and a shaft of the heater is caused. When the heater and the bearing part are covered by a cover made of high heat resistive material such as ceramics in order to protect sticking of food, heating efficiency is much lowered. On the other hand, in the microwave oven in accordance with the present invention, the wave guide plate also functions as a shield against the scattered substance from the foods, thereby to surely prevent the spark-discharge at the bearing part without inducing decrease of the thermal efficiency of the heater.

(2) In the conventional microwave oven, the heater must be bent in right angle, and a radius of curvature of about 20 mm—30 mm is necessary. Accordingly, a space of 25 mm—30 mm thickness between the heater and the upper wall of the heating chamber is not utilizable; that is, the space is a dead space. However, in the present invention, since the wave guide plate is provided in the above-mentioned dead space, the effective capacity of the heating chamber does not decrease.

(3) In the conventional microwave oven, configuration of the heater is restricted from requirement of thermal distribution of the heater and output amount and distribution of the microwave. However, according to the present invention, the output and the distribution of the microwave are not influenced from the configuration of the heater, since the output and the distribution of the microwave are controlled by the wave guide plate. Accordingly, it is the configuration of the heater can be determined independent from the amount of the output and the distribution of the microwave. Therefore, the thermal distribution of the heater is effectively improved.

It is possible to select the most suitable configuration of the wave guide plate independent from shape of the heater, since the wave guide plate of the present invention does not influence the thermal distribution of the heater. Therefore, the output amount and the distribution of the microwave can be sufficiently improved. Further, it becomes possible to uniformly radiate the microwave supplied from the microwave feeding portion into the heating chamber by rotating the wave guide plate.

(4) Since the wave guide plate is provided between the heater and the upper wall of the heating chamber and insulates the heat to be transmitted from the heating chamber to the outside of the heating chamber, temperature of a part above the heating chamber, where heater driving means such as a pulley and a belt or the like are provided, is kept low. And, the center part of the heating chamber is heated in good thermal efficiency, since the heat does not escape to the outside the heating chamber.

This effect is more improved by using a stainless plate, white enameled metal plate or particular ceramic coating metal plate as the wave guide plate.

(5) A slide contact means is used for supplying power to the heater. The slide contact means is provided with plural contacts, for realizing stable contact. Moreover, in case that the choke is provided, leakage of the microwave from the heater is more steadily prevented.

Thus, according to the present invention, it is possible to provide the microwave oven capable of uniform browning of the foods even when the food is put close to the heater, being much improved from the conventional one wherein browning is made along with the shape of the heater.

DESCRIPTION OF THE PREFERRED EMBODIMENT

Figure 3:
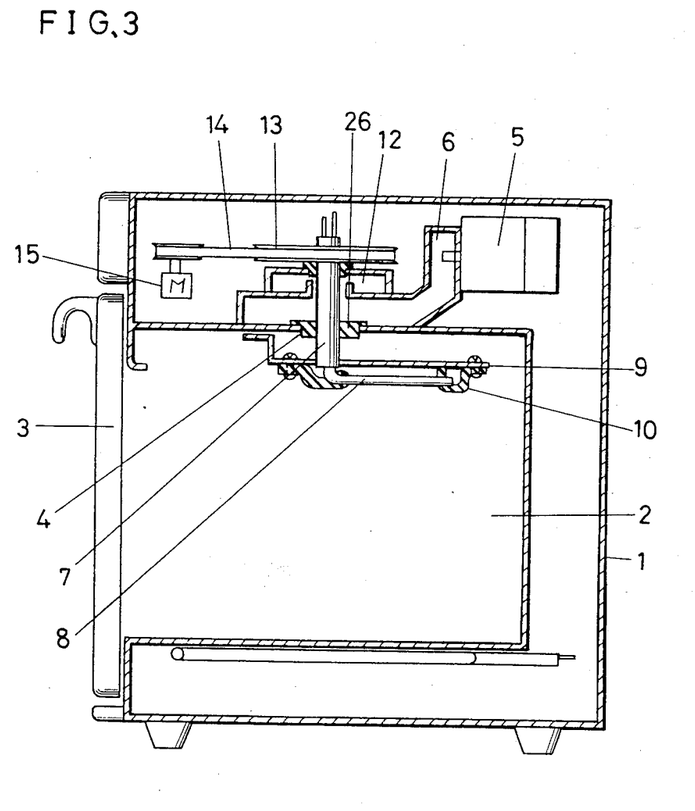
FIG. 3 is a side sectional view of a microwave oven with heater, as an embodiment of the present invention.

FIG. 3 is a microwave oven with heater of an embodiment. A heating chamber 2 is provided in a body 1, and the heating chamber 2 has a front door 3. A microwave feeding portion 4 is provided on an upper wall or ceiling of the heating chamber 2. A microwave generator 5 is connected to the microwave feeding portion 4 by a wave guide 6, while the wave guide 6 is connected to the heating chamber 2 by an inner conductor 7. A rotary heater 8 for browning food is provided in the heating chamber 2, so as to be rotated on a bearing 26 by a motor 15 through a pulley 13 and a belt 14.

Figure 4:
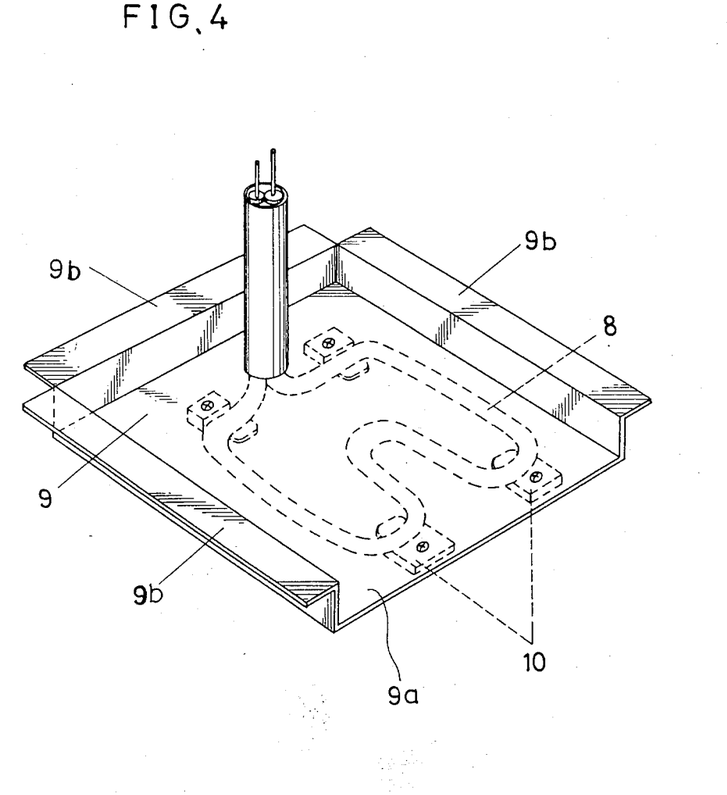
FIG. 4 is a partial perspective view showing the embodiment of FIG. 3.

A wave guide plate 9 shown in FIG. 4 for controlling microwave supplied from a microwave generator 5 is provided between the heater 8 and upper wall of the heating chamber 2 and fixed to the heater 8 with an insulator 10 therebetween, thereby preventing spark discharge between the heater 8 and the wave guide plate 9. The wave guide plate 9 is of box-shaped, wherein one side wall is removed making an opening 9a, and flange parts 9b, 9b, 9b are located near the ceiling of the heating chamber 2 in a manner to closely oppose each other in parallel, thereby giving considerable capacitance between the flange parts 9b and the upper wall of the heating chamber. Therefore, the almost all the microwave power supplied through the microwave feeding portion is radiated from the opening 9a of the wave guide plate 9 to the heating chamber 2 with substantial prevention from escaping through gaps between the flange parts 9b and the wall of the heating chamber 2. As a result, the microwave from the microwave feeding portion 4 can be optionally controlled by varying the configuration of the wave guide plate 9. Further, the wave guide plate 9 is fixed to the rotary heater 8 and rotates with a rotation of the rotary heater 8. Therefore, the microwave is radiated equally in all directions of the heating chamber 2 from the opening 9a with rotation of the rotary heater 8. Moreover, the wave guide plate 9 covers the bearing 26 of the rotary heater and prevents sticking of foods to be scattered at cooking to the bearing 26 and deterioration of insulation thereof.

Figure 5:
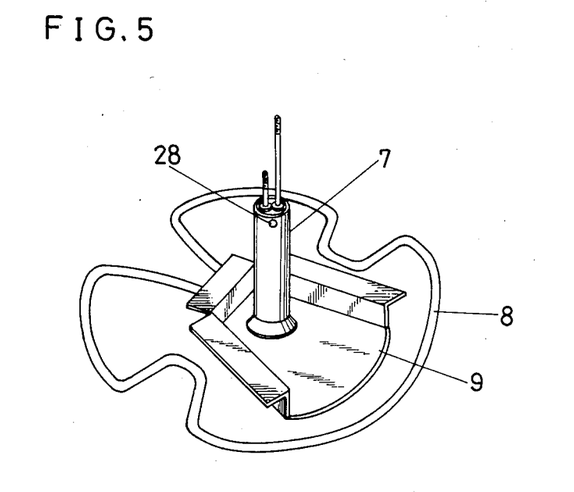
FIG. 5 is a partial perspective view of a microwave oven with heater, as a second embodiment.
Figure 6:
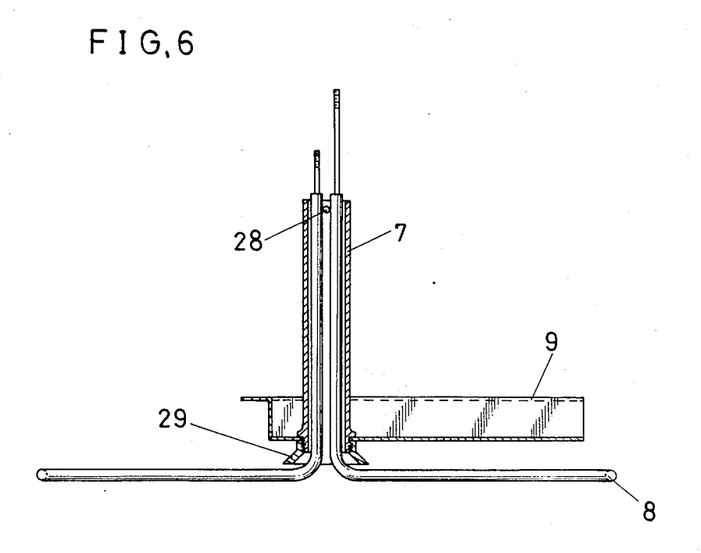
FIG. 6 is a side sectional view of the second embodiment of FIG. 5.
Figure 7:
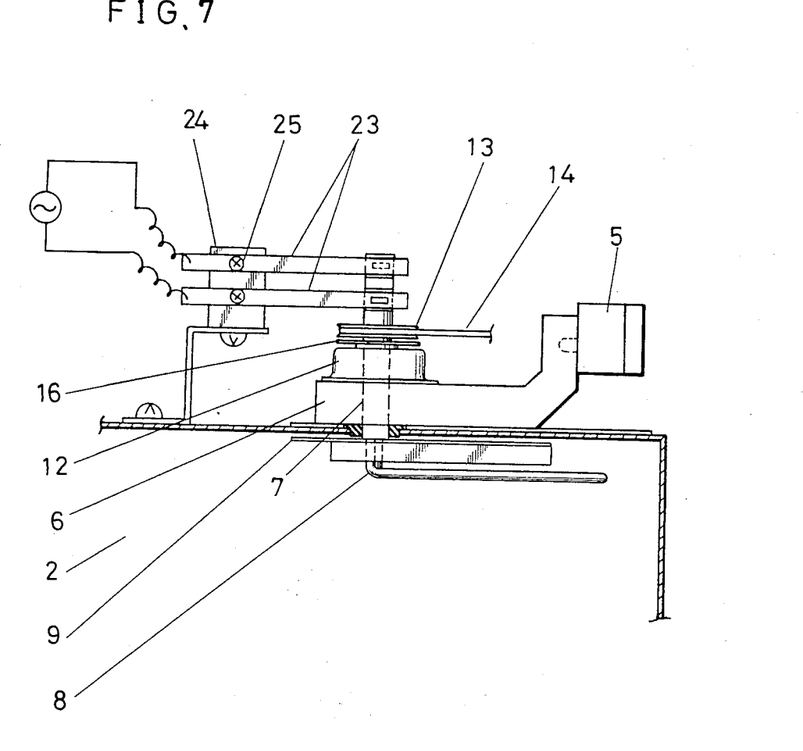
FIG. 7 is a schematic sectional view showing a process of power supply to a rotary heater of the embodiment.

FIGS. 5 and 6 are partial perspective view and sectional view of a part of heater of a second embodiment. In the second embodiment, the wave guide plate 9 and an inner conductor 7 are fixed by a screw 29 without needing the insulator 10 of the first embodiment. Therefore, appearance is improved and it becomes easy to remove stuck foods from the rotary heater.

FIGS. 7 through 12 show detailed heater part of another embodiment. The rotary heater 8 is provided in the substantial center of the upper wall of a heating chamber 2. The wave guide plate 9 is provided between the heater 8 and the upper wall of the heating chamber 2 coaxially with the heater 8. A wave guide 6 for introducing the microwave from the microwve generator 5 to the heating chamber 2 is provided in upper and outer wall of the heating chamber 2. The microwave is radiated from the wave guide plate 9 into the heating chamber 2 through the inner conductor 7, which is provided piercing the wave guide 6. A choke 12 for preventing leakage of the microwave to outside of the microwave oven through the inner conductor is provided on the wave guide 6. Further, in order to prevent even very small leakage of microwave passing through the choke 12, a metal plate 16 is provided in contact with the inner conductor 7, so as to give capacitance between opposing surfaces of the metal plate 16 and the choke 12.

Figure 10:
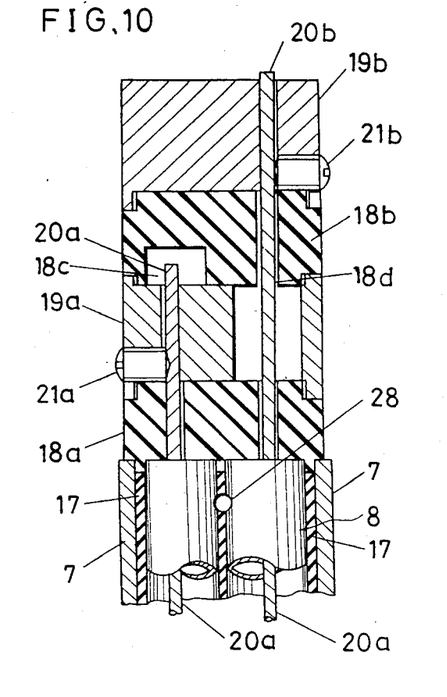
FIG. 10 is a detailed sectional view showing the rotary heater.
Figure 11:
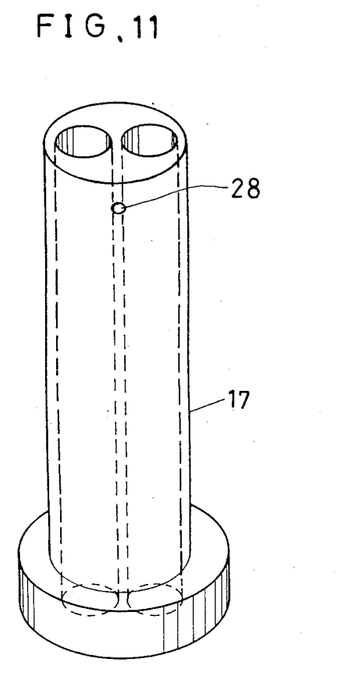
FIG. 11 is a perspective view showing an insulator having two holes in which the end parts of the heater is inserted.

The inner conductor 7 is rotatably supported by the bearings 26 and 27. The bearings 26 and 27 are made of material which is good in heat resistance, wear resistance and having low dielectric constant, such as sintered metals, ceramics, particular heat resistive resin, e.g., polycarbonate. An insulator 17 shown in FIG. 11 having two lengthwise through-holes, through which end parts of the heater 8 pass, is provided inside the inner conductor 7, in order to prevent spark discharge between the heater 8 and the inner conductor 7 and twist of shaft part of the heater 8 and to keep a stable rotation of the heater 8. A pulley 13 for rotating the heater 8 and wave guide plate 9 is provided on the metal plate 16. The pulley 13 is rotated by a motor 15 through a V-belt 14. An insulation sleeve 18a which is fitted to the inner conductor 7 in a manner to prevent deviation of axis is provided to upper end part of the inner conductor 7. Heater leads 20a and 20b pass through the insulation sleeve 18a. As shown in FIG. 10, a rotary contact 19a is provided on the insulation sleeve 18a. The rotary contact 19a has a hole through which the heater lead 20b passes with necessary space distance therearound and a screw 21a for mechanically fixing and electrically connecting the heater lead 20a to the rotary contact 19a.

Figure 8:
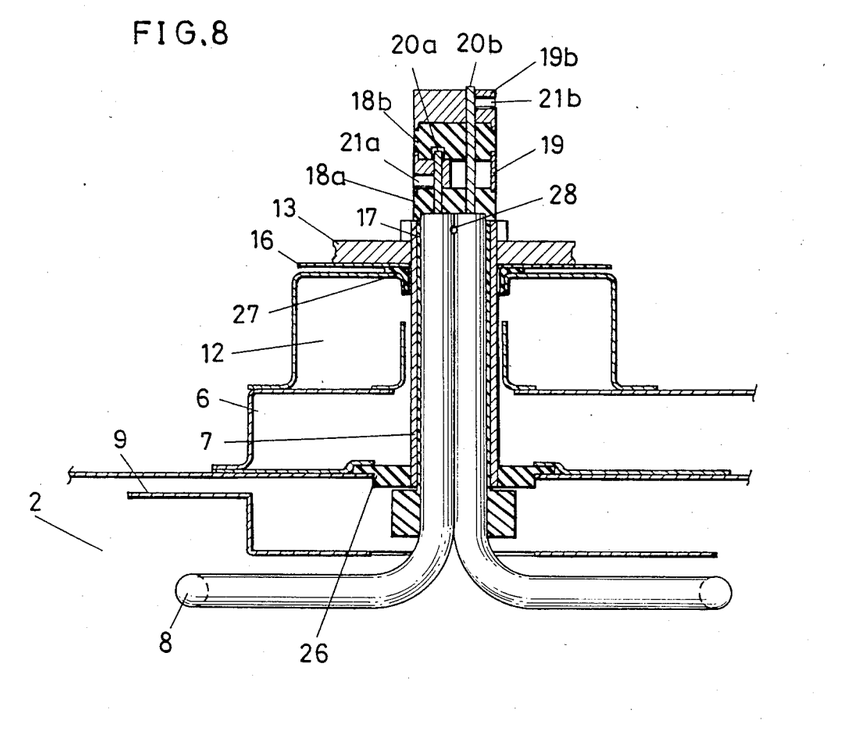
FIG. 8 is a partial sectional view showing the rotary heater part of the embodiment.

Further, an insulation sleeve 18b is coaxially fitted on the rotary contact 19a. The insulation sleeve 18b is provided with a pit 18c, which contains an end part of the heater lead 20a and a hole 18d, through which the heater lead 20b passes. Another rotary contact 19b is fitted on the insulation sleeve 19b in a manner to prevent deviation of axis, to which the heater lead 20b is mechanically and electrically connected by a screw 21b. As shown in FIG. 8 the inner conductor 7, the insulator 17 and the pulley 13 has a hole 28 for fixing them into one body by inserting a pin.

Figure 9:
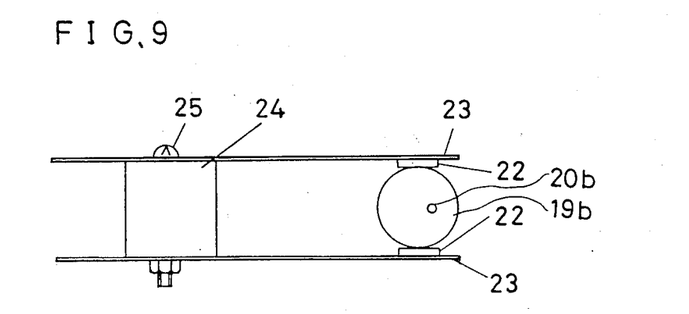
FIG. 9 is a plan view showing a slide contact means part of FIG. 8 for supplying power to the rotary heater.
Figure 12:
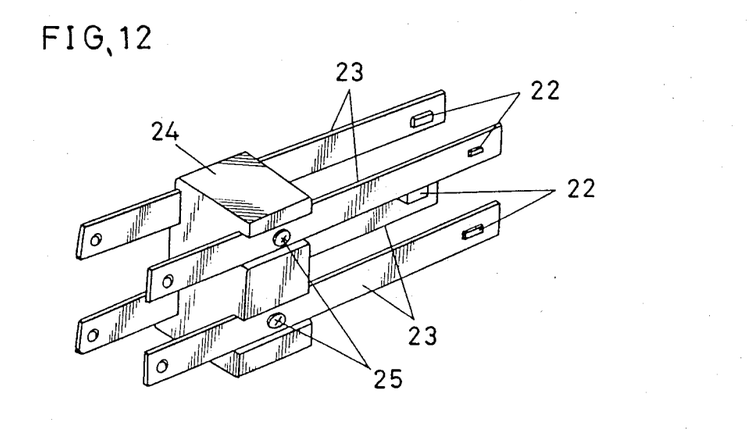
FIG. 12 is a perspective view showing a slide contact means for supplying power to a heater used in an embodiment of the present invention.

FIG. 9 and FIG. 12 show a slide contact means for supplying power to the heater 8. Plural slide contacts 22 are fitted to a contact arm 23 for reliability of contact to the rotary contacts 19a, 19b. The contact arm 23 is fixed to an arm support 24 by a screw 25. Each opposite arms 23, 23 is connected to each other by the screw 25. The slide contacts 22 contact to the rotary contacts 19a, 19b, for supplying about 2 KW of electric power to the heater 8.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is

1. A microwave oven with combined rotary heater and waveguide plate comprising:
    a heating chamber provided in a body,
    a microwave generator for generating microwave,
    a microwave feeding portion provided to said heating chamber,
    a wave guide connecting said microwave generator to said microwave feeding portion,
    a rotary heater provided in said heating chamber and eccentrically rotated around an axis substantially at center of said microwave feeding portion, and
    a wave guide plate fixed to said rotary heater for eccentrically rotated around said axis and having side walls and one opening for radiating microwave generated by said microwave generator.

2. A microwave oven with combined rotary heater and waveguide plate in accordance with claim 1, wherein
    said microwve supplied through said microwave feeding portion is radiated from said opening of said wave guide plate into said heating chamber.

3. A microwave oven with combined rotary heater and waveguide plate in accordance with claim 1, wherein
    said wave guide plate is made of a heat reflective material.

4. A microwave oven with combined rotary heater and waveguide plate in accordance with claim 3, wherein
    said heat reflective material is one member selected from the group consisting of stainless steel and whity-enameled metal.

5. A microwave oven with combined rotary heater and waveguide plate in accordance with claim 1, wherein
    said wave guide plate is baked with ceramic coating material which radiates infrared rays.

* * * * *